US010427660B2

(12) United States Patent
Kuo

(10) Patent No.: US 10,427,660 B2
(45) Date of Patent: Oct. 1, 2019

(54) HYDRAULIC CYLINDER RETARDER

(71) Applicant: Mei-Ching Kuo, Kaohsiung (TW)

(72) Inventor: Mei-Ching Kuo, Kaohsiung (TW)

(*) Notice: Subject to any disclaimer, the term of this patent is extended or adjusted under 35 U.S.C. 154(b) by 179 days.

(21) Appl. No.: 15/532,767

(22) PCT Filed: Dec. 10, 2014

(86) PCT No.: PCT/CN2014/093459
§ 371 (c)(1),
(2) Date: Jun. 2, 2017

(87) PCT Pub. No.: WO2016/086435
PCT Pub. Date: Jun. 9, 2016

(65) Prior Publication Data
US 2017/0361817 A1 Dec. 21, 2017

(30) Foreign Application Priority Data
Dec. 2, 2014 (CN) .......................... 2014 1 0718865

(51) Int. Cl.
F02G 3/00 (2006.01)
B60T 10/02 (2006.01)
F15B 15/22 (2006.01)
B60T 1/093 (2006.01)
B60T 10/04 (2006.01)
F16D 57/06 (2006.01)

(52) U.S. Cl.
CPC .............. *B60T 10/02* (2013.01); *B60T 1/093* (2013.01); *B60T 10/04* (2013.01); *F15B 15/22* (2013.01); *F16D 57/06* (2013.01); *F01P 2060/06* (2013.01)

(58) Field of Classification Search
CPC .......... B60T 10/02; F15B 15/22; F02G 1/043; F02G 1/0435; F02G 1/044; F16F 9/26; F16F 9/28
USPC ............ 188/304–310; 60/620, 614, 516–518
See application file for complete search history.

(56) References Cited

U.S. PATENT DOCUMENTS 1,708,560 A * 4/1929 Arnt ........................ F16F 9/26
188/304
1,883,206 A * 10/1932 Whitted .................... F16F 9/28
188/289
2,632,301 A * 3/1953 Brodie .................... F15B 11/04
137/488
4,222,239 A * 9/1980 Negishi ..................... F03G 7/06
60/325

(Continued)

FOREIGN PATENT DOCUMENTS

CN 2615406 Y 5/2004
CN 200943614 Y 9/2007

(Continued)

*Primary Examiner* — Christopher P Schwartz
(74) *Attorney, Agent, or Firm* — Muncy, Geissler, Olds & Lowe, P.C.

(57) ABSTRACT

A hydraulic cylinder retarder includes a hydraulic cylinder mechanism, a hydraulic oil conveying mechanism and a hydraulic oil valve mechanism. A piston component of the hydraulic cylinder mechanism is connected to a transmission device. Resistance to the piston movement of the hydraulic cylinder mechanism is generated by the hydraulic oil conveying mechanism and the hydraulic oil valve mechanism, so as to reduce the operation speed of the transmission device.

8 Claims, 2 Drawing Sheets

(56) References Cited

U.S. PATENT DOCUMENTS

| | | | | |
|---|---|---|---|---|
| 4,240,256 A | * | 12/1980 | Frosch | F02G 1/045 |
| | | | | 60/518 |
| 4,357,799 A | * | 11/1982 | Vos | F02G 1/053 |
| | | | | 60/518 |
| 4,387,566 A | * | 6/1983 | Berchowitz | F02G 1/044 |
| | | | | 60/518 |
| 4,395,880 A | * | 8/1983 | Berchowitz | F02G 1/044 |
| | | | | 60/518 |
| 4,597,411 A | * | 7/1986 | Lizell | F16F 9/465 |
| | | | | 137/493.8 |
| 9,528,467 B2 | * | 12/2016 | Dadd | F02G 1/0435 |
| 2007/0193266 A1 | * | 8/2007 | McConaghy | F02G 1/0435 |
| | | | | 60/520 |
| 2008/0276615 A1 | * | 11/2008 | Bennett | F01L 1/46 |
| | | | | 60/614 |

FOREIGN PATENT DOCUMENTS

| | | |
|---|---|---|
| CN | 101566200 A | 10/2009 |
| CN | 201771890 U | 3/2011 |
| CN | 202863429 U | 4/2013 |
| DE | 102008034974 A1 | 2/2010 |
| EP | 1288093 A1 | 3/2003 |

\* cited by examiner

HYDRAULIC CYLINDER RETARDER

BACKGROUND OF THE INVENTION

1. Field of the Invention

The present invention relates to retarders, and more particularly, to a hydraulic cylinder retarder.

2. Description of the Related Art

A retarder is a device for retarding speed, which is usually disposed on a vehicle and applied for assisting the brake. The retarder works by producing a reverse torque upon the vehicle transmission device, whereby the vehicle slows down. Since the vehicle applying the brake on a long distance down grade slope or a steep slope will cause an abrasion or heat generation, slowing the vehicle speed by use of the retarder instead is allowed to substitute the usage of the brake, thus saving the consumption.

Common retarders include an electric retarder, hydraulic retarder, and permanent magnet retarder. The electric retarder applies the resistance force generated by the electromagnetic induction eddy current to restrain the operation of the transmission device, so as to achieve the retarding effect. The hydraulic retarder applies the viscous drag force generated by a fluid to restrain the operation of the transmission device, so as to achieve the retarding effect. The permanent magnet retarder replaces the electromagnet of the electric retarder with a permanent magnet, so as to similarly apply the resistance force generated by the electromagnetic induction to restrain the operation of the transmission device.

Accordingly, although various forms of retarders exist, each type has its own features and disadvantages. Structure of the electric retarder is relatively simple but is easily affected by heat generation, so that such structure is usually applied with a cooling device. The hydraulic retarder is prevented from being easily affected by heat generation; however, the mechanical structure thereof is relatively complicated, together with large volume and heavy weight, so that the disposition of such retarder is difficult. The permanent magnet retarder is small and lightweight; however, such retarder is incapable of producing large torque, so that the applicable environments are limited Based on the reasons above, different types of retarders have different advantages and disadvantages, and are applicable for meeting different environmental considerations. If a special retarder is developed, the disadvantages of the existing retarders are able to be overcome, thus fulfilling more usage requirements.

SUMMARY OF THE INVENTION

The objective of the present invention is to provide a hydraulic cylinder retarder which works in a different manner against the conventional retarders. Also, the structure thereof is relatively simple, and is prevented from being affected by heat generation, and capable of producing sufficient torque.

For improving the issues of prior art, the technical features applied by the present invention provide a hydraulic cylinder retarder, comprising:

a hydraulic cylinder mechanism including a piston component and a piston compression chamber, the piston component connected with a transmission device, the piston component configured to conduct a piston motion against the piston compression chamber;

a hydraulic oil conveying mechanism including a hydraulic oil chamber and an oil conveying pipe, the oil conveying pipe connected with the hydraulic oil chamber and conveying a hydraulic oil to the hydraulic oil chamber; and a hydraulic oil valve mechanism including a unidirectional in-flow valve component and a unidirectional out-flow valve component, the unidirectional in-flow valve component connected between the piston compression chamber and the hydraulic oil chamber to allow the hydraulic oil to unidirectionally flow into the piston compression chamber through the unidirectional in-flow valve component, the unidirectional out-flow valve component connected between the piston compression chamber and the hydraulic oil chamber to allow the hydraulic oil to unidirectionally flow out with an out-flow cross sectional area from the piston compression chamber through the unidirectional out-flow valve component, wherein the out-flow cross sectional area is significantly smaller than a piston cross sectional area of the piston component, so as to produce a resistance force during the piston motion of the piston component, thereby slowing an operation speed of the transmission device.

Regarding the hydraulic cylinder retarder in accordance with an embodiment of the present invention, the unidirectional out-flow valve component is configured for allowing the adjustability of the size of the out-flow cross sectional area.

Regarding the hydraulic cylinder retarder in accordance with an embodiment of the present invention, a crank mechanism is further included. The hydraulic cylinder retarder comprises at least two hydraulic cylinder mechanisms, at least two hydraulic oil conveying mechanisms, and at least two hydraulic oil valve mechanisms. The piston components of the at least two hydraulic cylinder mechanisms are combined to the crank mechanism at the opposite phase angles thereof, respectively, such that when the piston component of one hydraulic cylinder mechanism carries out the expanding motion of the piston motion, the piston component of the other hydraulic cylinder mechanism carries out the compression motion of the piston motion. The piston component is connected with the transmission device through the crank mechanism.

Regarding the hydraulic cylinder retarder in accordance with an embodiment of the present invention, the hydraulic oil chamber includes a primary oil chamber and a secondary oil chamber. The primary oil chamber and the secondary oil chamber are separated and do not communicate with each other. The oil conveying pipe is connected between the primary oil chamber of one hydraulic oil conveying mechanism and the secondary oil chamber of another hydraulic oil conveying mechanism.

Regarding the hydraulic cylinder retarder in accordance with an embodiment of the present invention, the unidirectional in-flow valve component of the hydraulic oil valve mechanism includes a unidirectional in-flow valve member, which is connected between the piston compression chamber and the primary oil chamber, so as to allow the hydraulic oil to unidirectionally flow into the piston compression chamber through the unidirectional in-flow valve member.

Regarding the hydraulic cylinder retarder in accordance with an embodiment of the present invention, the unidirectional out-flow valve component of the hydraulic oil valve mechanism includes a plurality of unidirectional out-flow valve members connected between the piston compression chamber and the secondary oil chamber, so as to allow the hydraulic oil to unidirectionally flow out with an out-flow cross sectional area from the piston compression chamber through the plurality of unidirectional out-flow valve members, wherein the out-flow cross sectional area is smaller than an in-flow cross sectional area of the unidirectional in-flow valve member.

Regarding the hydraulic cylinder retarder in accordance with an embodiment of the present invention, the unidirectional out-flow valve members include an external control switch for externally controlling an on and off status of the unidirectional out-flow valve members, respectively, so as to vary the size of the out-flow cross sectional area.

Regarding the hydraulic cylinder retarder in accordance with an embodiment of the present invention, the hydraulic oil conveying mechanism further includes a unidirectional conveying valve member disposed on the oil conveying pipe, so as to allow the hydraulic oil to unidirectionally flow from the oil conveying pipe through the unidirectional conveying valve member to the primary oil chamber.

Regarding the hydraulic cylinder retarder in accordance with an embodiment of the present invention, the piston compression chamber of the hydraulic cylinder mechanism and the hydraulic oil chamber of the hydraulic oil conveying mechanism are disposed in the same hydraulic cylinder body.

Through the technical features applied by the present invention, by use of the out-flow cross sectional area significantly smaller than the piston cross sectional area, based on the fluid continuity equation: $A_1V_1=A_2V_2$, the speed of the piston is under control, with a resistance force generated upon the piston motion, such that the retarding effect is provided to the transmission device through the piston component. Also, due to the fact that the resistance force will vary in a direct proportion corresponding to the operation speed of the transmission device, a steady retarding effect is provided upon the transmission device. Different against the electric retarder, the hydraulic cylinder retarder provided by the present invention applies the lubrication and cooling effect of the hydraulic oil, and is therefore uneasy to be affected by heat generation. Different against the hydraulic retarder, the combination structure of the hydraulic cylinder and the piston applied in the hydraulic cylinder retarder provided by the present invention is relatively simple, without comparatively delicate mechanical arrangement, thus being easy to be disposed, and the size thereof is minimized. Different against the permanent magnet retarder, due to the volume compressibility of the hydraulic oil of the hydraulic cylinder retarder provided by the present invention is significantly small, the hydraulic effect will be sufficiently and immediately reflected on the resistance force, so as to efficiently produce a sufficient torque even if the volume is relatively small.

DETAILED DESCRIPTION OF THE INVENTION

Embodiments in accordance with the present invention are further illustrated by the following contents and the attached drawings.

Figure 1:
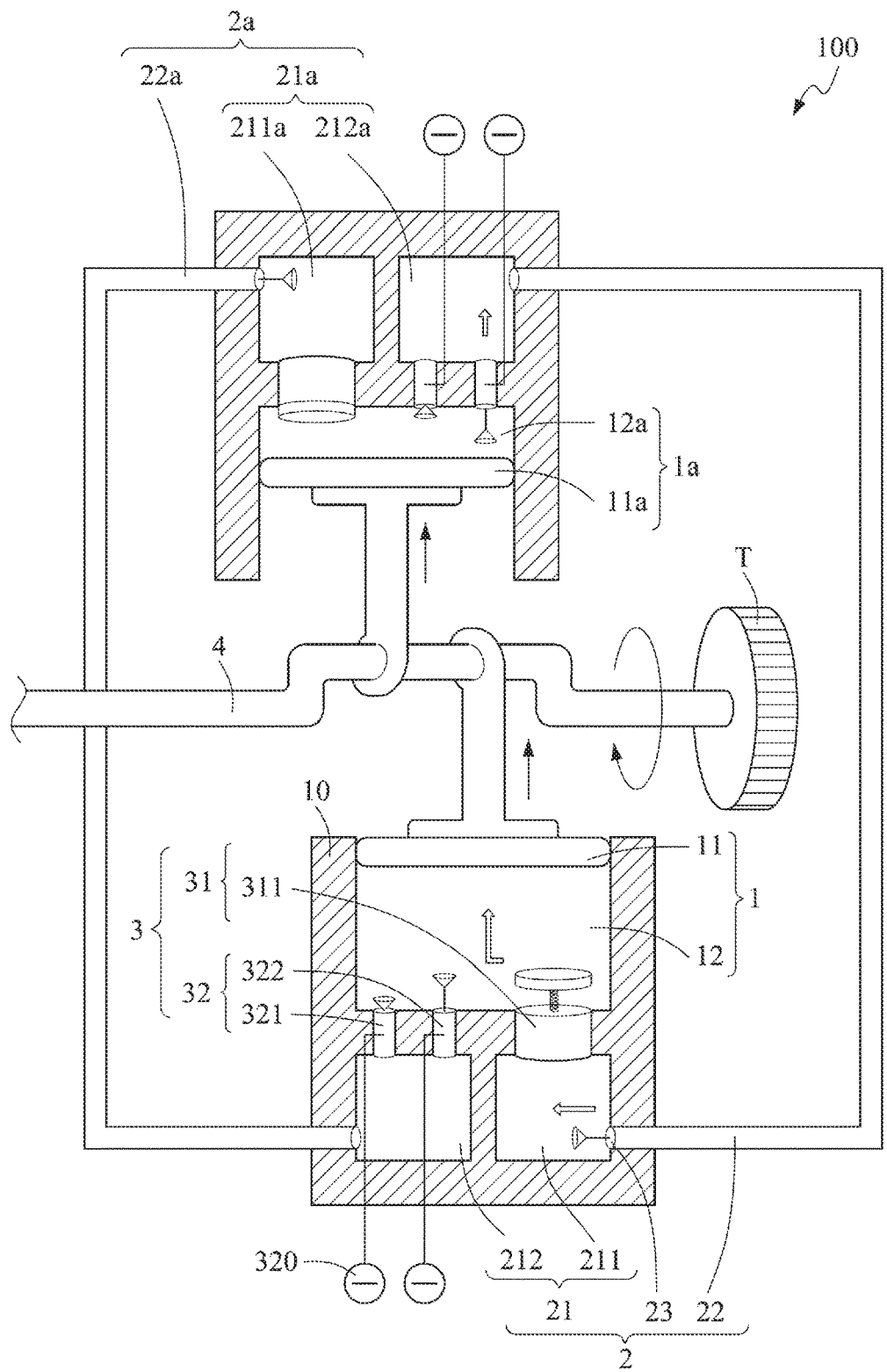
FIG. 1 is a schematic view illustrating the hydraulic cylinder retarder in accordance with an embodiment of the present invention.
Figure 2:
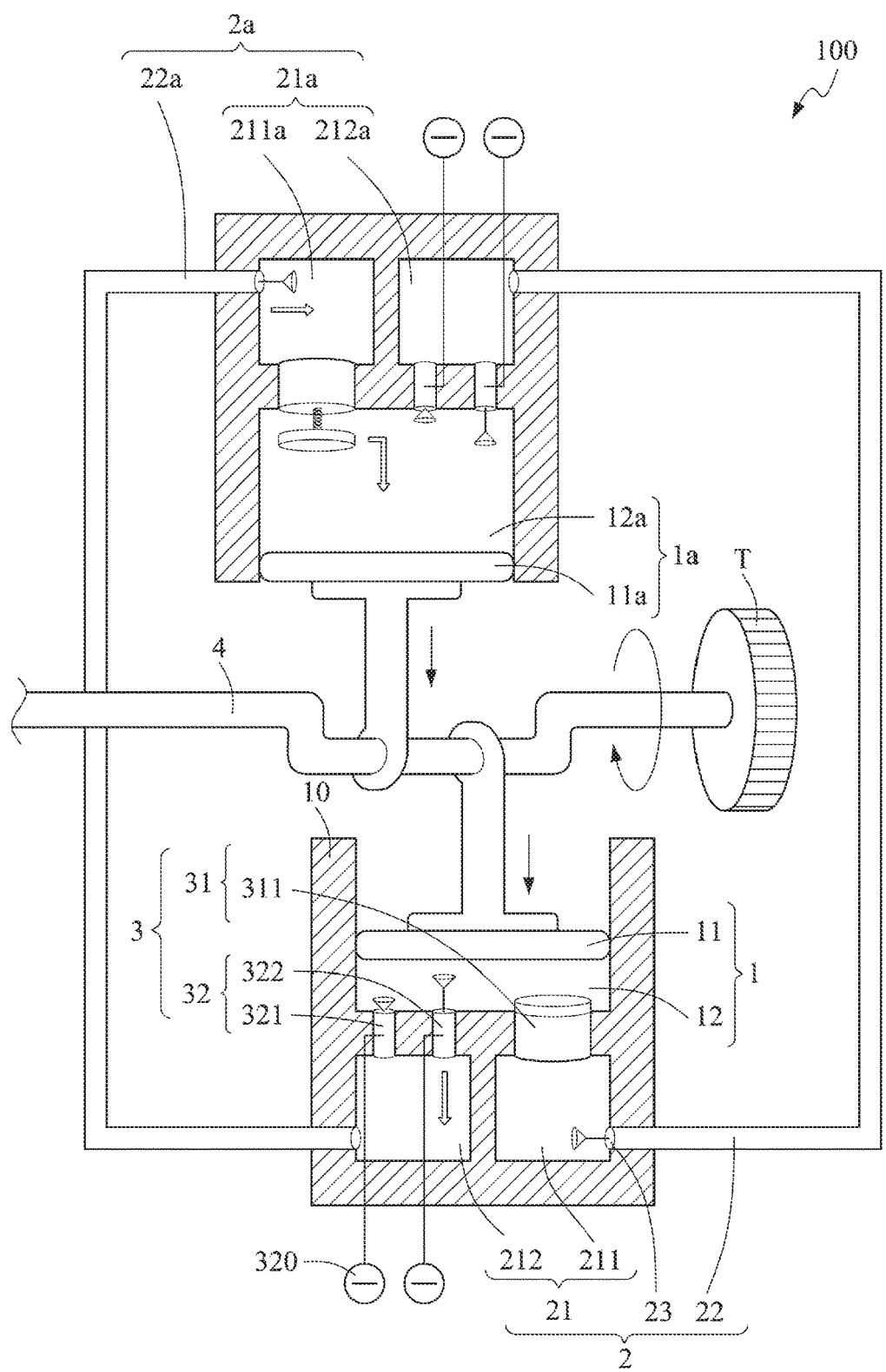
FIG. 2 is a schematic view illustrating the hydraulic cylinder retarder of FIG. 1 after half an operation period thereof.

As shown by FIG. 1 and FIG. 2, the embodiments of the present invention are illustrated. The illustration refers to one embodiment of the present invention and does not intent to limit the technical features of the present invention.

Referring by FIG. 1 and FIG. 2, a hydraulic cylinder retarder 100 in accordance with an embodiment of the present invention comprises a hydraulic cylinder mechanism 1 including a piston component 11 and a piston compression chamber 12, the piston component 11 connected with a transmission device T, the piston component 11 configured to conduct a piston motion against the piston compression chamber 12; a hydraulic oil conveying mechanism 2 including a hydraulic oil chamber 21 and an oil conveying pipe 22, the oil conveying pipe 22 connected with the hydraulic oil chamber 21 and conveying a hydraulic oil to the hydraulic oil chamber 21; and a hydraulic oil valve mechanism 3 including a unidirectional in-flow valve component 31 and a unidirectional out-flow valve component 32, the unidirectional in-flow valve component 31 connected between the piston compression chamber 12 and the hydraulic oil chamber 21 to allow the hydraulic oil to flow into the piston compression chamber 12 through the unidirectional in-flow valve component 31, the unidirectional out-flow valve component 32 connected between the piston compression chamber 12 and the hydraulic oil chamber 21 to allow the hydraulic oil to unidirectionally flow out with an out-flow cross sectional area from the piston compression chamber 12 through the unidirectional out-flow valve component 32, wherein the out-flow cross sectional area is significantly smaller than a piston cross sectional area of the piston component 11, so as to produce a resistance force during the piston motion of the piston component 11, thereby slowing an operation speed of the transmission device T.

Specifically, in the embodiment, the hydraulic cylinder retarder 100 further comprises a crank mechanism 4, two hydraulic cylinder mechanisms 1, 1a, two hydraulic oil conveying mechanisms 2, 2a, and two hydraulic oil valve mechanisms 3. The piston components 11, 11a of the two hydraulic cylinder mechanisms 1, 1a are radially combined to the crank mechanism 4 along different radial directions with respect to the crank mechanism 4. In other words, when illustrated from a motion period view point, the piston components 11, 11a of the two hydraulic cylinder mechanisms 1, 1a are combined to the crank mechanism 4 at opposite phase angles thereof. Therefore, when the piston component 11 of one hydraulic cylinder mechanism 1 carries out the expanding motion of the piston motion, the piston component 11a of the other hydraulic cylinder mechanism 1a carries out the compression motion of the piston motion (as shown in FIG. 1). Also, when the piston component 11 of one hydraulic cylinder mechanism 1 carries out the compression motion of the piston motion, the piston component 11a of the other hydraulic cylinder mechanism 1a carries out the expanding motion of the piston motion (as shown in FIG. 2). Notably, the intension of being combined "at the opposite phase angles" is to allow the different hydraulic cylinder mechanisms 1, 1a to be driven by the crank mechanism 4 to carry out different stages of the piston motion (such as the expanding motion and the compression motion) at the same time, respectively. Therefore, although the piston motions carried out by the different hydraulic cylinder mechanisms 1, 1a differ by half an operation period (phase angles differed by 180 degrees), the operation period difference is able to be moderated to one-third or one-fourth operation period or in other difference ratio. Further, the hydraulic cylinder mechanism, the hydraulic oil conveying mechanism, and the hydraulic oil valve mechanism are allowed to be provided in an amount of one or more than two, which are preferably combined to the crank mechanism at an equal phase angle difference, so as to provide an average resistance force during the whole operation period.

Referring to FIG. 1, when the piston component 11 of the hydraulic cylinder mechanism 1 carries out the expanding motion of the piston motion, the piston component 11 moves outward from the piston compression chamber 12, such that the space in the piston compression chamber 12 is increased, and the pressure thereof is decreased. In such status, due to an instantaneous pressure difference between the piston compression chamber 12 and the hydraulic oil chamber 21, the hydraulic oil flows to the piston compression chamber 12 through the unidirectional in-flow valve component 31 to recover the pressure balance.

Referring to FIG. 2, when the piston component 11 of the hydraulic cylinder mechanism 1 carries out the compression motion of the piston motion, the piston component 11 moves inward toward the piston compression chamber 12, such that the space in the piston compression chamber 12 is decreased, and the pressure thereof is increased. In such status, due to an instantaneous pressure difference between the piston compression chamber 12 and the hydraulic oil chamber 21, the hydraulic oil flows out from the piston compression chamber 12 through the unidirectional out-flow valve component 32 to recover the pressure balance.

During the aforementioned piston motion, when the piston component 11 moves with a higher speed, the pressure difference is larger, and the produced resistance force is larger. Also, when the out-flow section area of the hydraulic oil is smaller, due to the relatively small compressibility of the hydraulic oil and the limited increasing of the flowing speed, the recovering of the pressure balance will takes a longer time, and the resistance effect produced upon the piston motion is larger. Therefore, when the operation speed of the transmission device T is higher (such as when the vehicle moves on a long distance down grade slope or a steep slope), the resistance force imposed by the hydraulic cylinder retarder 100 is correspondingly increased. Under the effect of such resistance force and the running torque, the transmission device T tends to stably slow down.

Referring to FIG. 1 and FIG. 2, regarding the hydraulic cylinder retarder 100 in accordance with the embodiment of the present invention, the hydraulic oil chamber 21 includes a primary oil chamber 211 and a secondary oil chamber 212. The primary oil chamber 211 and the secondary oil chamber 212 are separated and do not communicate. The oil conveying pipe 22 is connected between the primary oil chamber 211 of one hydraulic oil conveying mechanism 2 and the secondary oil chamber 212a of the hydraulic oil chamber 21a of another hydraulic oil conveying mechanism 2a. The oil conveying pipe 22a of the other hydraulic oil conveying mechanism 2a is connected between the secondary oil chamber 212 of the hydraulic oil conveying mechanism 2 and the primary oil chamber 211a of the hydraulic oil chamber 21a of the hydraulic oil conveying mechanism 2a. According, in the embodiment, the hydraulic oil circulates between the two hydraulic oil conveying mechanisms 2, 2a, so that the hydraulic cylinder retarder 100 is not necessarily connected to an external hydraulic oil tank.

Referring to FIG. 1 and FIG. 2, regarding the hydraulic cylinder retarder 100 in accordance with the embodiment of the present invention, the unidirectional in-flow valve component of the hydraulic oil valve mechanism 3 includes a unidirectional in-flow valve member 311, which is connected between the piston compression chamber 12 and the primary oil chamber 211, so as to allow the hydraulic oil to unidirectionally flow through the unidirectional in-flow valve member 311 to the piston compression chamber 12. The unidirectional in-flow valve member 311 in the embodiment is configured to provide sufficient in-flow cross sectional area, so as to lower additional resistance force which affects the piston motion.

Further, the unidirectional out-flow valve component 32 of the hydraulic oil valve mechanism 3 preferably includes a plurality of unidirectional out-flow valve members 321, 322 (which are provided in an amount of two in the drawings) that are connected between the piston compression chamber 12 and the secondary oil chamber 212, so as to allow the hydraulic oil to unidirectionally flow out with the out-flow cross sectional area from the piston compression chamber 12 through the plurality of unidirectional out-flow valve members 321, 322, wherein the summation of the out-flow cross sectional areas of the plurality of unidirectional out-flow valve members 321, 322 is significantly smaller than a piston cross sectional area of the piston component. Preferably, the unidirectional out-flow valve members 321, 322 include an external control switch 320 for externally controlling an on and off status of the unidirectional out-flow valve members, respectively, so as to vary the size of the out-flow cross sectional area, thus adjusting the resistance force imposed by the hydraulic cylinder retarder 100 to the transmission device T.

Referring to FIG. 1 and FIG. 2, regarding the hydraulic cylinder retarder 100 in accordance with the embodiment of the present invention, the hydraulic oil conveying mechanism 2 further includes a unidirectional conveying valve member 23 disposed on the oil conveying pipe 22, so as to allow the hydraulic oil to unidirectionally flow to the primary oil chamber 211 through the unidirectional conveying valve member 23. By use of the unidirectional conveying valve member 23, the flowing of the hydraulic oil becomes smoother, so as to decrease the reflux in the pipe.

Referring to FIG. 1 and FIG. 2, regarding the hydraulic cylinder retarder 100 in accordance with the embodiment of the present invention, the piston compression chamber 12 of the hydraulic cylinder mechanism 1 and the hydraulic oil chamber 21 of the hydraulic oil conveying mechanism 2 are disposed in the same hydraulic cylinder body 10. Such configuration saves room and achieves a stronger structure, so as to improve the reliability and stability of the whole device. However, the manner of configuration is not limited to such arrangement. The piston compression chamber 12 and the hydraulic oil chamber 21 are allowed to be separately disposed.

With such configuration, the hydraulic cylinder retarder 100 applies the resistance force produced during the piston motion, so as to slow down the transmission device T. Also, with the direct proportion relationship between the resistance force and the operation speed of the transmission device T, steady slowing effect is achieved. The hydraulic cylinder retarder 100 applies the lubrication and cooling effect of the hydraulic oil, thus being prevented from being easily affected by heat generation. Also, the combination structure between the cylinder and the piston of the hydraulic cylinder retarder 100 is relatively simple, without comparatively delicate mechanical arrangement, thus being easy to be disposed, and the size thereof is minimized. Further, due to the volume compressibility of the hydraulic oil of the hydraulic cylinder retarder 100 being significantly small, a sufficient torque is efficiently and immediately produced even if the volume is relatively small, thereby achieving the slowing effect.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A hydraulic cylinder retarder, comprising:
at least two hydraulic cylinder mechanisms, each hydraulic cylinder mechanism including a piston component and a piston compression chamber, the piston components connected with a transmission device, each piston component configured to conduct a piston motion against the corresponding piston compression chamber;
at least two hydraulic oil conveying mechanisms, each hydraulic oil conveying mechanism including a hydraulic oil chamber and an oil conveying pipe, each oil conveying pipe connected with the corresponding hydraulic oil chamber and conveying a hydraulic oil to the hydraulic oil chamber;
a crank mechanism, the piston components of the at least two hydraulic cylinder mechanisms being radially combined to the crank mechanism along different radial directions with respect to the crank mechanism, so as to be connected with the transmission device through the crank mechanism, respectively, such that when the piston component of one of the at least two hydraulic cylinder mechanism carries out an expanding motion of the piston motion, the piston component of another hydraulic cylinder mechanism carries out a compression motion of the piston motion; and
at least two hydraulic oil valve mechanisms, each hydraulic oil valve mechanism including a unidirectional in-flow valve component and a unidirectional out-flow valve component, each unidirectional in-flow valve component connected between one of the piston compression chambers and the corresponding hydraulic oil chamber to allow the hydraulic oil to unidirectionally flow into the piston compression chamber through the unidirectional in-flow valve component, each unidirectional out-flow valve component connected between one of the piston compression chambers and the corresponding hydraulic oil chamber to allow the hydraulic oil to unidirectionally flow out with an out-flow cross sectional area from the piston compression chamber through the unidirectional out-flow valve component, wherein the out-flow cross sectional area is significantly smaller than a piston cross sectional area of the piston components, so as to produce a resistance force during the piston motion of the piston components, thereby slowing an operation speed of the transmission device.

2. The hydraulic cylinder retarder of claim 1, wherein, the hydraulic oil chamber comprises a primary oil chamber and a secondary oil chamber that are separated and do not communicate, the oil conveying pipe connected between the primary oil chamber of one hydraulic oil conveying mechanism and the secondary oil chamber of another hydraulic oil conveying mechanism.

3. The hydraulic cylinder retarder of claim 2, wherein, the unidirectional in-flow valve component of the hydraulic oil valve mechanism comprises a unidirectional in-flow valve member which is connected between the piston compression chamber and the primary oil chamber, so as to allow the hydraulic oil to unidirectionally flow to the piston compression chamber through the unidirectional in-flow valve member.

4. The hydraulic cylinder retarder of claim 3, wherein, the unidirectional out-flow valve component of the hydraulic oil valve mechanism comprises a plurality of unidirectional out-flow valve members connected between the piston compression chamber and the secondary oil chamber, so as to allow the hydraulic oil to unidirectionally flow out with an out-flow cross sectional area from the piston compression chamber through the plurality of unidirectional out-flow valve members, wherein the out-flow cross sectional area is smaller than an in-flow cross sectional area of the unidirectional in-flow valve member.

5. The hydraulic cylinder retarder of claim 4, wherein, the unidirectional out-flow valve member includes an external control switch for externally controlling an on and off status of the unidirectional out-flow valve member, so as to vary a size of the out-flow cross sectional area.

6. The hydraulic cylinder retarder of claim 2, wherein, the hydraulic oil conveying mechanism further comprises a unidirectional conveying valve member disposed on the oil conveying pipe, so as to allow the hydraulic oil to unidirectionally flow from the oil conveying pipe through the unidirectional conveying valve member to the primary oil chamber.

7. The hydraulic cylinder retarder of claim 1, wherein, the unidirectional out-flow valve component is configured to allow an adjustability of the out-flow cross sectional area.

8. The hydraulic cylinder retarder of claim 1, wherein, the piston compression chamber of the hydraulic cylinder mechanism and the hydraulic oil chamber of the hydraulic oil conveying mechanism are disposed in the same hydraulic cylinder body.

* * * * *